US012510970B2

(12) United States Patent
Dietz et al.

(10) Patent No.: US 12,510,970 B2
(45) Date of Patent: Dec. 30, 2025

(54) SIMULTANEOUS GESTURE-BASED ACTUATION OF A MEDICAL FACILITY

(71) Applicant: Siemens Healthcare GmbH, Erlangen (DE)

(72) Inventors: Volker Dietz, Hoechstadt an der Aisch (DE); Tobias Leis, Ergoldsbach (DE); Marcel Ruf, Langensendelbach (DE); Jennifer Jones, Nuremberg (DE); Steffen Dittrich, Erlangen (DE); Milena Limpert, Zeitlofs (DE); Nicole Maass, Heroldsbach (DE); Steffen Riess, Winkelhaid (DE)

(73) Assignee: Siemens Healthineers AG, Forchheim (DE)

( * ) Notice: Subject to any disclaimer, the term of this patent is extended or adjusted under 35 U.S.C. 154(b) by 116 days.

(21) Appl. No.: 17/494,268

(22) Filed: Oct. 5, 2021

(65) Prior Publication Data
US 2022/0113809 A1 Apr. 14, 2022

(30) Foreign Application Priority Data
Oct. 13, 2020 (EP) .................................... 20201566

(51) Int. Cl.
*G06F 3/01* (2006.01)
*G06F 3/16* (2006.01)
*G16H 30/00* (2018.01)

(52) U.S. Cl.
CPC .............. *G06F 3/017* (2013.01); *G06F 3/167* (2013.01); *G16H 30/00* (2018.01)

(58) Field of Classification Search
CPC ..................................................... G16H 30/00
See application file for complete search history.

(56) References Cited

U.S. PATENT DOCUMENTS

| | | | |
|---|---|---|---|
| 2004/0023719 | A1 | 2/2004 | Hussaini et al. |
| 2010/0016924 | A1 | 1/2010 | Doerr |

(Continued)

FOREIGN PATENT DOCUMENTS

| | | |
|---|---|---|
| CN | 110365778 A | 10/2019 |
| CN | 111223556 A | 6/2020 |

(Continued)

OTHER PUBLICATIONS

SoulPedal: "Wireless Foot Controller", URL https://soulpedal.com, accessed on Nov. 26, 2019.

(Continued)

*Primary Examiner* — Tan H Tran
(74) *Attorney, Agent, or Firm* — Harness, Dickey & Pierce, P.L.C.

(57) ABSTRACT

A command communication facility is described. The command communication facility includes a sensor unit for detecting a movement of an operator; a fixing unit for securing the sensor unit to the operator; an evaluation unit for evaluating the detected movement of the operator and for identifying a command based upon the detected movement; and a command communication unit for transmitting a control command to a medical facility that is to be operated based upon the identified command. A command communication system is also described. An operating system is also described. A command communication method is also described.

31 Claims, 6 Drawing Sheets

(56) References Cited

U.S. PATENT DOCUMENTS

| | | | |
|---|---|---|---|
| 2011/0199393 A1* | 8/2011 | Nurse | G06F 3/017 345/665 |
| 2012/0200494 A1* | 8/2012 | Perski | G06F 3/017 345/156 |
| 2013/0063345 A1* | 3/2013 | Maeda | G06F 3/0481 345/156 |
| 2013/0096575 A1 | 4/2013 | Olson | |
| 2014/0266570 A1* | 9/2014 | Sharma | A43B 3/42 340/4.12 |
| 2015/0002490 A1* | 1/2015 | Han | A61B 8/462 345/204 |
| 2016/0262485 A1* | 9/2016 | Walker | A61B 5/6807 |
| 2016/0299570 A1 | 10/2016 | Davydov | |
| 2016/0378938 A1* | 12/2016 | Kuhrt | G16H 40/63 700/302 |
| 2017/0103440 A1 | 4/2017 | Xing et al. | |
| 2017/0168557 A1* | 6/2017 | Lee | G06F 3/167 |
| 2017/0177088 A1* | 6/2017 | Miseldine | G06F 3/0482 |
| 2017/0336870 A1* | 11/2017 | Everett | G06F 3/017 |
| 2019/0150876 A1* | 5/2019 | Kagermeier | G16H 30/20 |
| 2020/0168321 A1 | 5/2020 | Kohle et al. | |
| 2020/0201447 A1* | 6/2020 | Goetz | G06F 3/0304 |
| 2020/0253320 A1* | 8/2020 | Guard | G06F 1/163 |

FOREIGN PATENT DOCUMENTS

| | | |
|---|---|---|
| DE | 102008040502 A1 | 1/2010 |
| WO | WO 2005114524 A2 | 12/2005 |

OTHER PUBLICATIONS

EnOcean: „EnOcean—The World of Energy Harvesting Wireless Technology, White Paper, Januar 2016.

Orpyx: "SI Sensory Insoles Help Prevent Diabetic Foot Ulcers", URL https://www.orpyx.com, accessed on Nov. 26, 2019.

Bamberg M, Stacy J. et al.: „Gait Analysis Using Shoe-Integrated Wireless Sensor System, IEEE Transactions on Information Technology in Biomedicine, vol. 12, Issue 4, Jul. 2008.

B&L Engineering: "Footswitches & Accessories", URL http://www.bleng.com/bio-mechanics/footswitchesaccessories, accessed on Nov. 26, 2019.

Moticon: "High Performance Motion Analysis", URL https://www.moticon.de/insole3-overview, accessed on Nov. 26, 2019.

EnOcean: „Energy Harvesting Wireless Power for the Internet of Things, White Paper, Aug. 2015.

Koneczny, Sonja: "Erfassung und Analyse von Schwachstellen in der Funktionsstelle OP deutscher Krankenhäuser"; Inaugural-Dissertation an der Medizinischen Fakultät der Eberhard Karls Universität zu Tübingen, Seite 36, 2008, URL: https://d-nb.info/990914526/34; 2008; and English translation thereof.

Extended European Search Report dated Mar. 29, 2021.

Zheng Yu et al: "sensor and Medical engineering"; Tianjin University Press, Jul. 31, 2019; ISBN 978-7-5618-6445-6.

Chen Wenxi et al:; "A mobile phone-based wearable vital signs monitoring system"; Fifth International Conference on Computer and Information Technology—Proceedings; pp. 950-955; Jan. 1, 2005.

* cited by examiner

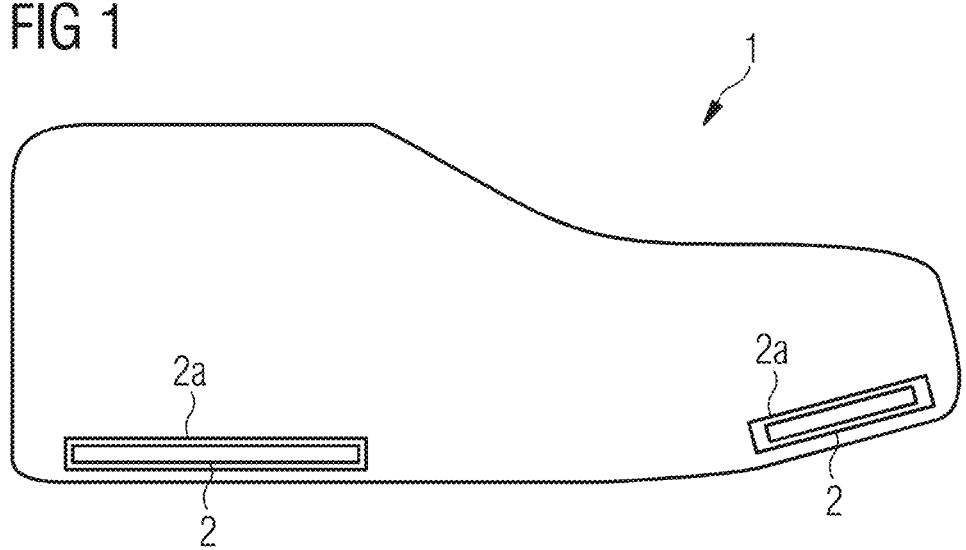
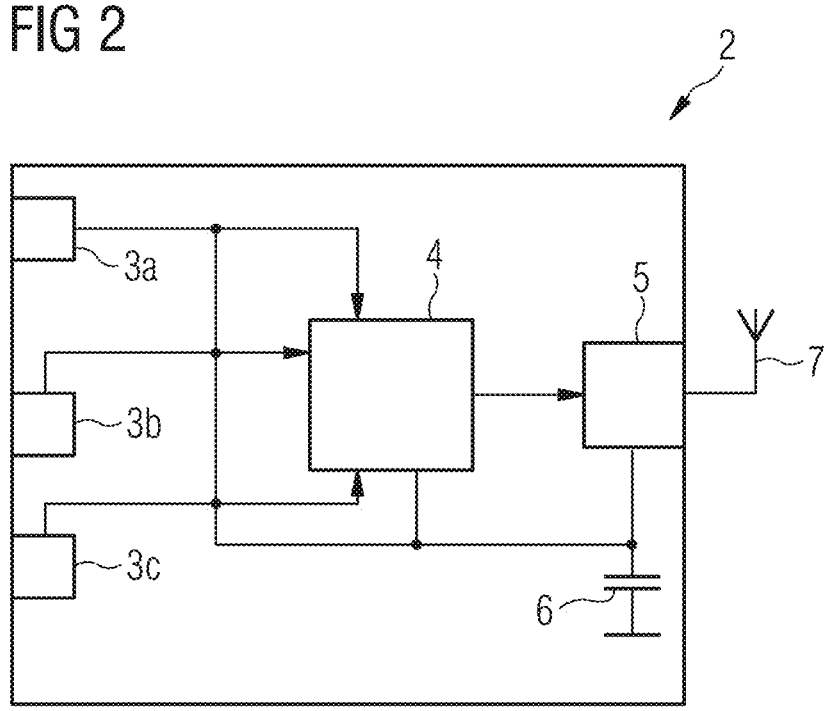

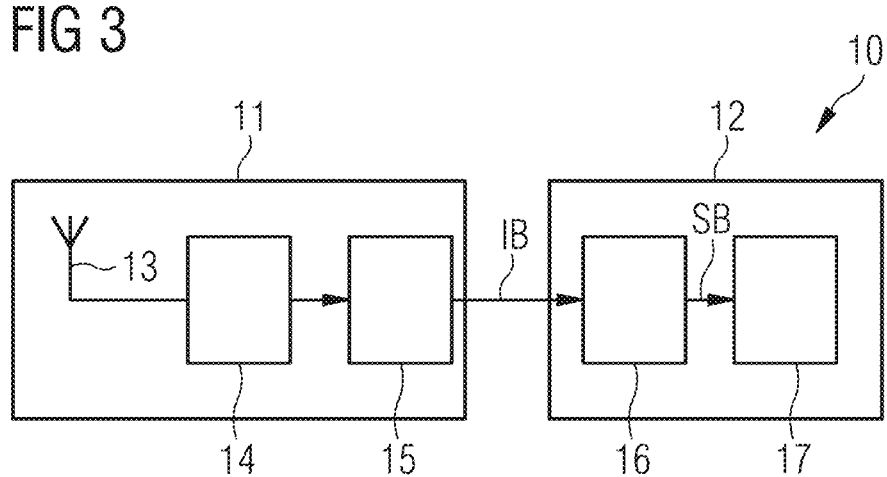
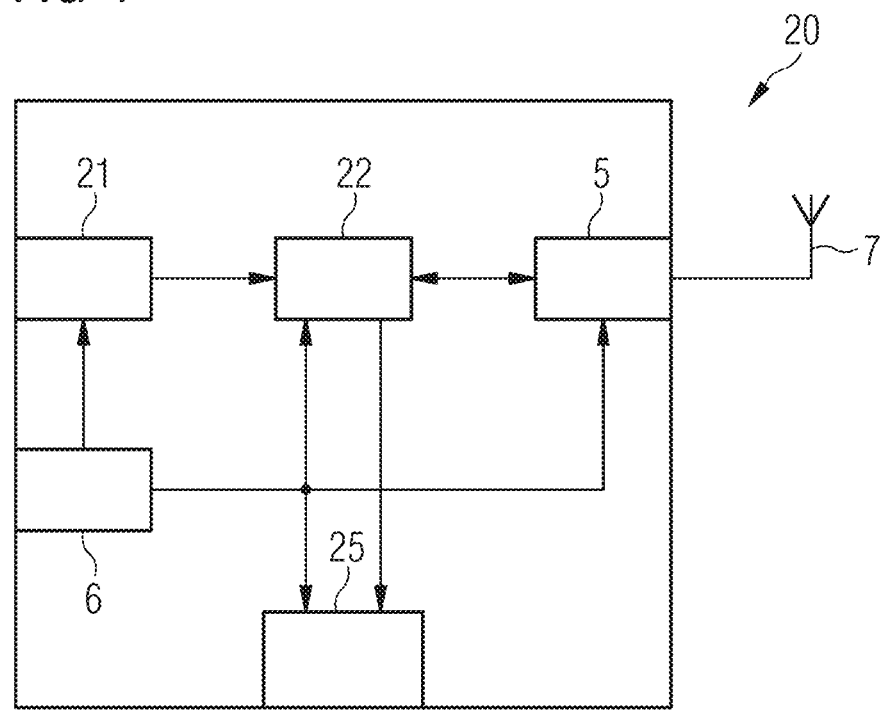

SIMULTANEOUS GESTURE-BASED ACTUATION OF A MEDICAL FACILITY

PRIORITY STATEMENT

The present application hereby claims priority under 35 U.S.C. § 119 to European patent application number EP20201566.5 filed Oct. 13, 2020, the entire contents of each of which are hereby incorporated herein by reference.

FIELD

Example embodiments of the invention generally relate to a command communication facility; a command communication system; and a command communication method.

BACKGROUND

In the field of medicine, two- or three-dimensional image data is routinely generated with the aid of modern imaging methods and can be used for visualizing an imaged examination subject as well as for other applications.

Examples of modern medical imaging methods include computed tomography (CT), magnetic resonance tomography, the use of machines called PET scanners, and x-ray imaging via C-arm systems.

In order to ensure the safety of patients, it is provided in all of these methods that an imaging-based medical diagnosis cannot be initiated until a qualified operator, for example a medical technical assistant (MTA), a radiologist or a clinician, requests the activation of the device by way of a manual input. Conventional device(s) for manual input of an activation command into a medical facility are switches, keys or pushbuttons and buttons, wherein the switches, pushbuttons, keys and buttons are usually disposed directly on or at the medical facility. Alternatively, the cited activation device(s) may also be connected to a medical facility via an electric cable connection or an electromagnetic radio link. Furthermore, additional interfaces for enabling interaction between an operator and a medical facility may be present, such as e.g. a pushbutton, a touch display or quite generally such mechanical or mechatronic units which can be actuated by hand or by foot, for example a footswitch, by the operator. The cited input units are in most cases part of an operator control module.

In addition, there is also the problem of cleaning and disinfecting the operator control elements in order to reduce the transmission of diseases in the clinical environment. Conventional operator control modules are in most cases disposed on the floor and can therefore easily become dirty, be contaminated with organic substances, in particular bodily fluids, and also be easily damaged by someone tripping over them.

In order to actuate such an operator control module, a footswitch, for example, an operator must usually be in its immediate vicinity. The operator is therefore tied to a particular location if he or she wishes to activate a particular medical device. A typical operator control module for activating a medical device is a footswitch. The problem associated with such a conventional footswitch, however, is that in order to be supplied with power supply or to transmit data, it requires at least one electric cable, which is routed across the floor of an examination room or operating suite and represents a trip hazard for medical staff.

Furthermore, joysticks are also used, in order to actuate C-arms, for example. A joystick enables an operator to change a continuous-time variable of a movement, i.e. for example to perform a minor excursion at a low speed and to drive a major excursion at a high speed.

Joysticks are also employed for controlling motion sequences in the automobile industry, in aviation and in robotics. Such a joystick may be disposed for example at the working height of a person who is seated and therefore it is not subject to such heavy soiling as a floor-mounted unit. The disadvantage with a joystick, however, is that the user must use his or her hands to operate the device and therefore does not simultaneously have his or her hands free in order to examine or treat a patient, for example.

Moreover, other facilities operable by hand or foot and having a radio link are also used for activating medical devices. However, when controlled remotely by hand via a radio link, these devices likewise suffer the drawback that the operator does not have his or her hands free for further interactions.

Mobile foot-operated control facilities connected by radio link to a medical system that is to be activated are also used. Footswitches serve primarily to realize switching operations, such as turning on and turning off a radiation source, for example, or maneuvering a patient table.

With such a facility, there are neither cables present as trip hazards nor must the operator's hands be used for controlling the mobile foot-operated facility. However, if a large number of such mobile foot-operated facilities are lying scattered around on the floor, the foot-operated facilities themselves represent trip hazards in this case. The above-described hygiene problems also occur in the case of wireless transmission.

In addition to actuating an electromechanical switching element in order to activate or deactivate a medical device, it is desirable if an operator is also able to control further functions of the medical device. Examples of this are scrolling images or browsing through a sequence of images, changing the image contrast, zooming in or zooming out when viewing images, or changing other modality-specific parameters.

SUMMARY

The inventors have discovered that it is furthermore desirable to safeguard the operator control of safety-relevant functions via a second channel that is independent of a first operator control channel. For example, the inventors have discovered that operator control of a release of radiation or of a movement of a medical device via a footswitch can be confirmed in addition via a voice control function, camera-based monitoring or RF-based monitoring of a gesture.

Gestures that are recognized by image capture can be made visible for example by movement of the operator's hands or fingers, where the gestures may signify gripping, releasing, moving or zooming. The movement of feet or toes may for example control an increase in speed, a decrease in speed, a movement to the left or a movement to the right. An eye movement to the left, right, up or down can represent a decision on direction. A movement of the head to the left or right can likewise be used to indicate a change of direction. Furthermore, during the actions controlled by a gesture, feedback can be provided via a haptic signal, for example in the form of a vibration, in order to confirm the triggering of a desired action to the operator.

The inventors have discovered that gesture control enables the operator to control a medical device and treat a patient simultaneously. This is made possible because triggering an action of the medical device does not require the operator to change position in order to actuate an input device. In this way, the operator can initiate an action without losing focus on a current treatment activity. Even when his or her hands or eyes are needed for treating the patient or actuating another medical facility, the operator can still exercise control of a medical facility by issuing commands by foot movement, for example. By adopting such a simultaneous approach it is also possible to realize economies in terms of deployment of medical technicians.

At least one embodiment of the application provides a device(s) of actuating and activating a medical device with improved safety with regard to accidents and reduced overhead for assuring hygiene in an examination environment, which actuation and activation can also be implemented safely and conveniently while a treatment of a patient is being carried out at the same time.

Embodiments of the application provide a command communication facility, a command communication system, an operating system, and a command communication method.

The command communication facility according to at least one embodiment of the invention includes a sensor unit for detecting a physical movement by an operator. Such a sensor unit comprises at least one sensor. The sensor is configured to detect a movement. Such a movement can be determined for example by way of one or more acceleration measurements or a measurement of a mechanical deformation. The movement can follow a predefined movement pattern which is used for generating command information. The sensor unit and/or even the entire command communication facility are/is secured to the operator via a fixing unit. It should be mentioned in this context that the command communication facility is preferably also configured not only to process the sensor data of the internal sensor unit but in addition also to receive sensor data from external sensors and to evaluate the data. The fixing unit enables the sensor unit, preferably the command communication facility, to be used as a so-called "embedded system" which an operator has on his or her person at all times without having to keep hold of a control unit, for example a joystick.

At least one embodiment of the inventive command communication system comprises at least one embodiment of a first inventive command communication facility featuring gesture recognition. At least one embodiment of the first inventive command communication facility is attached to the operator and is embodied as a master facility for the purpose of bidirectional data exchange with at least one slave facility. In other words, at least one embodiment of the first inventive command communication facility operates as master in accordance with the master-slave principle. Commands can therefore be transmitted only when the command transfer has been enabled via at least one embodiment of the first inventive command communication facility.

At least one embodiment of the inventive operating system comprises an imaging medical facility for monitoring an operation on a patient. In particular, an imaging medical facility enables an operation region located internally in a patient to be visualized prior to or during an operation. The inventive operating system also comprises an operating facility. Such an operating facility may comprise for example an apparatus for conducting minimally invasive operations, instruments for treating and monitoring a patient, such as for example monitoring the most important bodily functions, as well as an operating table. The inventive operating system of at least one embodiment also comprises an inventive command communication facility or an inventive command communication system of at least one embodiment which is configured to transmit a control command to the imaging medical facility and/or to activate the imaging medical facility by way of the command.

With at least one embodiment of the inventive command communication method, a movement of an operator is detected via a gesture recognition unit disposed on the operator. A command of the operator is identified based upon the detected movement and the identified command is relayed to a medical facility that is to be controlled.

At least one embodiment of the inventive command communication method shares the advantages of at least one embodiment of the inventive command communication facility.

A largely software-based implementation has the advantage that data processing facilities already in use previously in the prior art can also be easily retrofitted with the requisite hardware, such as e.g. a sensor unit and a fixing unit, and reconfigured via a software update in order to operate in the manner according to at least one embodiment of the invention. To that extent, the object is also achieved via a corresponding computer program product having a computer program which can be loaded directly into a memory facility of a data processing facility and comprises program sections for the purpose of performing all the steps of at least one embodiment of the inventive method when the computer program is executed in the data processing facility.

As well as the computer program, such a computer program product may, where appropriate, comprise additional constituent parts, such as e.g. a set of documentation, and/or additional components, including hardware components, such as e.g. hardware keys (dongles, etc.) to allow use of the software.

A computer-readable medium, for example a memory stick, a hard disk or some other portable or permanently installed data carrier on which the program sections of the computer program that can be read in and executed by a data processing facility, for example a computer unit, are stored, may be used for transporting the computer program product to the memory facility of the data processing facility and/or for storing the same on the data processing facility. For this purpose, the computer unit may comprise e.g. one or more cooperating microprocessors or the like.

At least one embodiment is directed to a command communication facility, comprising:
 a sensor unit to detect a movement of an operator;
 a fixing unit to secure at least one of the sensor unit and the command communication facility to the operator;
 an evaluation unit to evaluate the movement of the operator detected and to identify a command based upon the movement detected;
 a command communication unit to transmit a control command to a medical facility, to be operated based upon the command identified.

At least one embodiment is directed to a command communication system comprising:
 the command communication facility of an embodiment being a first command communication facility, securable to the operator, and embodied as a master facility for a bidirectional exchange with at least one slave facility,
 the gesture sensor unit of the command communication facility being activated,
 the command communication facility being configured to forward a command determined to a second command communication facility, and
 the second command communication facility being disposed at a distance from the operator, embodied as a slave facility for a bidirectional data exchange with a master facility, the command communication system including an evaluation unit comprising at least one of:

a gesture recognition unit activated from a distance to an operator for detecting a movement or gesture of the operator, a voice recognition unit including a voice recognition capability, and a device configured to receive the command received by the first command communication facility and to transmit a control command to the medical facility based on the command received.

At least one embodiment is directed to an operating system, comprising:

an imaging medical facility, an operating facility, the command communication facility of an embodiment, configured to transmit a control command to the imaging medical facility.

At least one embodiment is directed to a command communication method, comprising:

detecting a movement of an operator via a gesture recognition unit disposed on the operator;

automatically evaluating the movement of the operator detected and identifying a command based upon the movement detected; and transmitting a control command to a medical facility, to be operated based upon the command identified.

At least one embodiment is directed to a non-transitory computer program product storing a computer program, directly storable in a memory facility of a command communication system, including program sections for performing the method of an embodiment when the computer program is executed in the command communication system.

At least one embodiment is directed to a non-transitory computer-readable medium storing program sections, readable in and executable by a computer unit, to perform the method of an embodiment when the program sections are executed by the computer unit.

BRIEF DESCRIPTION OF THE DRAWINGS

The invention is described and explained in more detail below with reference to the example embodiments illustrated in the figures, in which:

FIG. 1 schematically illustrates a shoe having two command communication facilities according to an example embodiment of the invention, FIG. 2 schematically illustrates a command communication facility according to an example embodiment of the invention, FIG. 3 schematically illustrates a second command communication facility of a command communication system according to an example embodiment of the invention, which facility is embodied as a permanently installed receive facility and actuator facility, FIG. 4 schematically illustrates a shoe-mounted gesture sensor according to an example embodiment of the invention, FIG. 5 schematically illustrates a computed tomography system having a command communication system according to an example embodiment of the invention.

DETAILED DESCRIPTION OF THE EXAMPLE EMBODIMENTS

Figure 5:
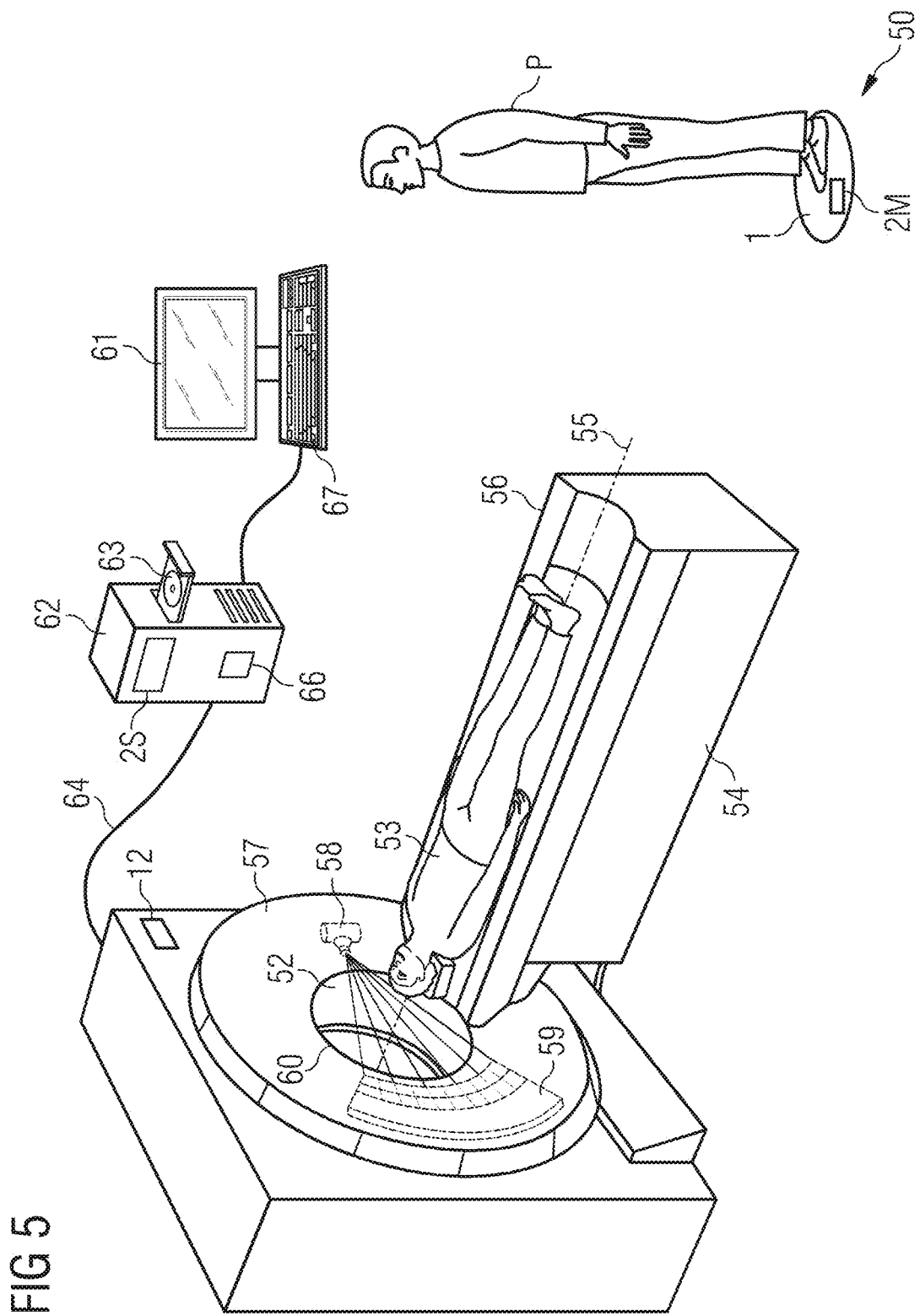

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. At least one embodiment of the present invention, however, may be embodied in many alternate forms and should not be construed as limited to only the example embodiments set forth herein.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one embodiment of the invention relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

The command communication facility according to at least one embodiment of the invention includes a sensor unit for detecting a physical movement by an operator. Such a sensor unit comprises at least one sensor. The sensor is configured to detect a movement. Such a movement can be determined for example by way of one or more acceleration measurements or a measurement of a mechanical deformation. The movement can follow a predefined movement pattern which is used for generating command information. The sensor unit and/or even the entire command communication facility are/is secured to the operator via a fixing unit. It should be mentioned in this context that the command communication facility is preferably also configured not only to process the sensor data of the internal sensor unit but in addition also to receive sensor data from external sensors and to evaluate the data. The fixing unit enables the sensor unit, preferably the command communication facility, to be used as a so-called "embedded system" which an operator has on his or her person at all times without having to keep hold of a control unit, for example a joystick.

Also part of the command communication facility according to at least one embodiment of the application is an evaluation unit for evaluating the detected movement of the operator and for identifying a command based upon the detected movement. The evaluation unit preferably comprises a device known as an ultra-low-power microcontroller, which can be operated with low amounts of energy, for example via an autonomous energy generation system disposed on or in the command communication facility.

The sensor data acquired by the sensors, preferably the operator movement detected by the sensor unit, is analyzed by the evaluation unit. The evaluation unit classifies the detected movement according to whether it is an intended or unintended movement. Such a classification can be accomplished for example by comparing the detected movement with one or more reference movements, each of which is assigned to a specific command. The sensor unit therefore comprises a mechatronic component by which a movement of an operator can be detected. Once a command is recognized or identified, a control command is transmitted to a medical facility that is to be controlled based upon the identified command, for example the identified command itself, by a command communication unit, which is likewise part of the command communication facility according to the invention.

The command communication facility according to at least one embodiment of the invention is therefore embodied as a mobile facility in the form of a so-called "smart wearable", which the operator carries with him or her at all times. Parts of or the entire command communication facility may be embodied as an embedded system which is configured specifically for actuating and controlling a medical device via movement. Advantageously, an operator of a medical facility can control an operating procedure via an arbitrary predetermined movement. This enables multiple tasks to be carried out in parallel. For example, the operator can use his or her hands to examine a patient and at the same time control a medical facility, such as an imaging medical device for example, with another part of the body. What's more, the operator has the input unit in the form of the inventive command communication facility on his or her person at all times, so it cannot get in anyone's way or gather dust and the operator does not have to look for it when wanting to issue a command.

Hygiene regulations are therefore also easier to comply with in examination rooms or operating suites because the operator control elements cannot be so easily soiled and in the best case, when everyone has their own command communication facility, are each used only by a single person. Furthermore, a risk of cross-infection between individual operators due to a smear infection can be avoided since a contactless control or actuation of functions of a medical device is made possible. Using a body-wearable command communication facility also permits different medical devices to be actuated and controlled in the same way.

Conventionally, operator control switches of mechanical devices of different type possess different characteristics in terms of their location, their pressure point, the necessary application of force required for an actuation, and the functions realized by the actuation. With the inventive relocation of the input interface to the user, a more intuitive operator control functionality can now be implemented by way of a unified operator control concept extending across multiple devices. Owing to the relocation of the input interface toward the body of the operator, the user's attention can also remain focused on the current parallel activity during operator control of a medical device. For example, the user's attention does not need to be diverted from the patient in order to actuate the medical device. Thus, advantageously, there is no need for additional personnel to take over operator control of the medical device in parallel during safety-relevant treatment steps in which full attention is required.

For example, similar functions can be initiated on different devices in the same way or via the same gesture without a user having to find the corresponding differently embodied operator control elements on the individual differently structured devices. The learning curve is shortened in this way. For example, the need to familiarize oneself with different user interfaces of different medical devices is dispensed with since similar functions can always be controlled in similar fashion via the same body movements. Advantageously, operator control of a medical device is intuitively integrated into a workflow by way of an example embodiment of the inventive command communication facility. Furthermore, a multi-usability and reusability is also possible for different applications if the evaluation unit is embodied as programmable.

At least one embodiment of the inventive command communication system comprises at least one embodiment of a first inventive command communication facility featuring gesture recognition. At least one embodiment of the first inventive command communication facility is attached to the operator and is embodied as a master facility for the purpose of bidirectional data exchange with at least one slave facility. In other words, at least one embodiment of the first inventive command communication facility operates as master in accordance with the master-slave principle. Commands can therefore be transmitted only when the command transfer has been enabled via at least one embodiment of the first inventive command communication facility.

In addition, the gesture sensor unit of the first command communication facility is activated, i.e. the first command communication facility responds to gesture control and is configured to communicate a determined command, preferably an initialization command, to a second, preferably inventive command communication facility.

The second, preferably inventive command communication facility of at least one embodiment is likewise part of at least one embodiment of the inventive command communication system and is disposed remotely from the operator, preferably on a medical facility that is to be controlled. The second command communication facility is embodied as a slave facility for bidirectional data exchange with a master facility and comprises an evaluation unit which includes at least one subunit for recognizing command contents based upon sensor data. Preferably, the evaluation unit comprises a gesture recognition unit which is activated from a distance to the operator in order to detect a gesture of the operator. The evaluation unit preferably also comprises a voice recognition unit having a voice recognition capability in order to recognize voice content based upon acoustic sensor data.

The evaluation unit therefore has the capabilities required for detecting a gesture or capturing acoustic information of the operator from a distance to the operator. These functions can be activated from the first command communication facility embodied as the master facility. Preferably, therefore, the second command communication facility also comprises a voice recognition capability by which a voice command from the operator can be evaluated. In addition, the second command communication facility is configured to receive a command received by the first command communication facility, for example a voice command, and based upon the command to transmit a control command to the medical facility or to actuate the latter based upon the received command. Advantageously, the second command communication facility can firstly be initialized as ready-to-receive by way of a command submitted via the first inventive command communication facility, initiated for example via a movement or gesture of the operator. The operator then controls the medical facility by way of an additional control command which is generated either directly, for example as a result of a voice command or a gesture, either directly by detection of the voice command or gesture by the second command communication facility, or by detection of the additional command by the first command communication facility and a subsequent forwarding of the detected additional command to the second command communication facility, which than actuates the medical facility in accordance with the received or detected command.

Advantageously, an increased reliability in the operator control of the medical device can be achieved by way of the described two-stage approach, because the medical device can be controlled only when an initialization command has first been given by the operator.

At least one embodiment of the inventive operating system comprises an imaging medical facility for monitoring an operation on a patient. In particular, an imaging medical facility enables an operation region located internally in a patient to be visualized prior to or during an operation. The inventive operating system also comprises an operating facility. Such an operating facility may comprise for example an apparatus for conducting minimally invasive operations, instruments for treating and monitoring a patient, such as for example monitoring the most important bodily functions, as well as an operating table. The inventive operating system of at least one embodiment also comprises an inventive command communication facility or an inventive command communication system of at least one embodiment which is configured to transmit a control command to the imaging medical facility and/or to activate the imaging medical facility by way of the command.

Advantageously, in addition to allowing an operation to be performed by one and the same person, at least one embodiment of the inventive operating system also enables a medical imaging procedure to be performed in parallel, wherein the surgeon uses his or her hands for example to carry out the operation, tracks the operating procedure inside the patient while looking at the screen of the medical imaging facility, and monitors and at the same time controls the imaging with another part of his or her body. Thus, the surgeon does not need to look away from the screen in order to actuate the medical imaging facility and also does not have to interrupt the operating procedure. For example, the surgeon can dynamically adjust the image presentation, the field of view and the localization of the region to be imaged during the operating procedure in order to obtain an optimal visualization for the respective phase of an operation.

With at least one embodiment of the inventive command communication method, a movement of an operator is detected via a gesture recognition unit disposed on the operator. A command of the operator is identified based upon the detected movement and the identified command is relayed to a medical facility that is to be controlled.

At least one embodiment of the inventive command communication method shares the advantages of at least one embodiment of the inventive command communication facility.

The majority of the essential components of the inventive command communication facility can be embodied in the form of software components. This relates in particular to the evaluation unit and parts of the command communication unit.

In principle, however, some of these components may also be realized in the form of software-assisted hardware, for example FPGAs or the like, in particular when there is a requirement for particularly fast calculations. Similarly, the required interfaces may be embodied as software interfaces, for example when it is simply a matter of importing data from other software components. They may, however, also be embodied as hardware-based interfaces which are controlled by suitable software.

A largely software-based implementation has the advantage that data processing facilities already in use previously in the prior art can also be easily retrofitted with the requisite hardware, such as e.g. a sensor unit and a fixing unit, and reconfigured via a software update in order to operate in the manner according to at least one embodiment of the invention. To that extent, the object is also achieved via a corresponding computer program product having a computer program which can be loaded directly into a memory facility of a data processing facility and comprises program sections for the purpose of performing all the steps of at least one embodiment of the inventive method when the computer program is executed in the data processing facility.

As well as the computer program, such a computer program product may, where appropriate, comprise additional constituent parts, such as e.g. a set of documentation, and/or additional components, including hardware components, such as e.g. hardware keys (dongles, etc.) to allow use of the software.

A computer-readable medium, for example a memory stick, a hard disk or some other portable or permanently installed data carrier on which the program sections of the computer program that can be read in and executed by a data processing facility, for example a computer unit, are stored, may be used for transporting the computer program product to the memory facility of the data processing facility and/or for storing the same on the data processing facility. For this purpose, the computer unit may comprise e.g. one or more cooperating microprocessors or the like.

The claims as well as the following description in each case contain particularly advantageous embodiments and developments of the invention. In particular, the claims of one claims category may at the same time also be developed analogously to the dependent claims of a different claims category. Furthermore, the various features of different example embodiments and claims may also be combined within the scope of the invention in order to create new example embodiments.

Preferably, the sensor unit of at least one embodiment of the inventive command communication facility comprises an internal gesture sensor unit for gesture recognition. By an internal gesture sensor unit is to be understood a gesture sensor unit which is disposed inside an article of clothing of an operator or an object worn by the operator, i.e. is integrated into the object. Gesture recognition relates generally to a targeted movement of a person by which the person wishes to convey information, preferably a control command. Such a gesture may comprise for example a movement of a person using one or both hands, using one foot or both feet, using one leg or both legs, using an eye or both eyes, or a movement of the head. A gesture may also comprise a predefined combination and/or sequence composed of one or more of the cited movements. Advantageously, the sensor unit is not visible from outside or is protected externally so that the operator is not adversely affected in terms of his or her movement sequences and the gesture sensor unit is well protected against mechanical damage. The internal gesture sensor unit may be disposed in an article of clothing, for example. Advantageously, a gesture by someone wearing the command communication facility about his or her person may be detected automatically and used for actuating a medical facility.

Gesture recognition can preferably be used for detecting and recognizing an "intentional" movement. If such an "intentional" movement is identified based upon the movement pattern, a command for preparing an action can be issued, for example. For example, a voice input for issuing differentiated commands for controlling a medical facility can be enabled.

To achieve a further increase in reliability in terms of an improved detection probability of operator control of a medical facility, a predetermined movement pattern may include a movement pattern of a so-called "safe intentional" movement. In order to make the recognition of a command particularly reliable, such a "safe intentional" movement may comprise a more complex movement sequence which cannot be easily confused with a random natural movement. For example, a corresponding movement pattern may comprise a tapping of a foot in a predetermined sequence, such as, for example, toe, heel, toe, or a multiple tapping with the heel.

To achieve a very reliable command communication, it is particularly preferred to distribute multiple motion sensors to different points on the body. For example, at least one sensor or even an entire command communication facility can be integrated in each case in both shoes of a person. With such an arrangement, complex movement sequence patterns of two feet could be generated and recognized. Even more complex movement patterns would be possible for example via an arrangement of motion sensors on several individual toes. As a result of such an increase in complexity in the actuation process, an improved reliability in the identification of commands based upon body movements is possible on the one hand, and on the other hand differentiated and more complex commands or command sequences can also be communicated, thereby enabling a more comprehensive remote control of a medical device.

The gesture recognition can preferably be realized by detection of a movement of the sensor unit or of a mechanical force acting on the sensor unit.

Binary actions, such as switching on or switching off, for example, can be detected or triggered via a piezoceramic element of a sensor unit as replacement for a mechanical switch.

Greater and arbitrary variations of actions to be executed, such as, for example, a displacement upward or downward or to the left or right, can be realized via an acceleration measuring facility, for example.

Furthermore, a facility for measuring a plastic deformation or a change in a magnetic field may also be used as a sensor unit.

The fixing unit of at least one embodiment of the inventive command communication facility is preferably embodied to secure the gesture sensor unit to or in an article of clothing, preferably in a shoe. The fixing unit may therefore be suitable for integration into the article of clothing, preferably in a sole of a shoe, particularly preferably as an insole in a shoe. Preferably, the fixing unit of the inventive command communication facility is embodied as a recess in the sole of the shoe. Particularly preferably, the fixing unit is removable or interchangeable, embodied as a textile overshoe, for example. Advantageously, the command communication facility can be worn more or less passively by the operator, without the latter having to be actively concerned with it, for example having to keep hold of the command communication facility. The operator therefore has his or her extremities, in particular his or her hands, available for tasks that are to be handled in parallel. Integrating the command communication facility into a shoe or attaching it to a shoe creates more extensive options and superior convenience compared to controlling the command communication facility with the hands, since the hands remain free for parallel activities. A shoe-mounted gesture sensor therefore allows additional degrees of freedom or configuration opportunities for a workflow of a medical examination. In particular, multiple actions may be controlled or executed in parallel. An example of an actuation within the context of such a workflow is an actuation of an image presentation in a medical imaging modality. In this situation, an observation perspective or a zoom effect may be controlled for example with the aid of a gesture, and an examination or treatment of a patient may be prepared or carried out in parallel using the hands.

Also preferably, the command communication unit of at least one embodiment of the inventive command communication facility comprises a radio transmission unit for transmitting the identified command to the medical facility that is to be controlled. Advantageously, the command can be transmitted wirelessly so that no obstructive transmission cable is required, which may for example represent a source of interference or a potential cause of accidents for persons present.

At least one embodiment of the inventive command communication facility preferably includes an energy generation and storage unit which is configured to generate electrical energy from the kinetic energy of the operator. Such a process is also referred to as "energy harvesting" (or "energy scavenging") and relates to the extraction of small amounts of electrical energy from sources such as the ambient heat in the environment, vibrations or air currents for mobile devices operating at low electrical power. The structures employed for generating this energy are also known as nanogenerators. With wireless technologies, energy harvesting avoids restrictions due to a wired power supply or batteries. The energy generation and storage unit is preferably embodied as an internal electronic energy generation and storage unit which preferably comprises a piezoceramic element that transforms the kinetic energy of motion, for example the walking or running movement of the wearing user, into electric energy and stores it.

Particularly preferably, in the event that at least one embodiment of the inventive command communication facility is implemented as a slave unit, it is embodied in such a way that the sensor unit comprises an acoustic sensor unit and the evaluation unit comprises a voice recognition unit for recognizing and interpreting voice commands of the operator. Voice recognition makes spoken language accessible to automatic data acquisition, i.e. data can be input by voice in order to perform an actuation of a medical facility. Advantageously, a voice command can communicate more complex content than a gesture. Furthermore, there is no need to learn any symbolic gestures by heart in order to actuate and control a medical facility. Particularly advantageously, an operator has his or her extremities, in particular the hands, free for activities that are to be performed in parallel.

Also preferably, the command communication facility is configured such that the internal gesture recognition function recognizes one of the following function commands:
scrolling images on an image display of a medical device or browsing through a sequence of such images,
changing the image contrast,
zooming in or zooming out from an image presentation,
changing specific parameters of a medical device.

Advantageously, an image display or another parameter of a medical device can be adjusted with the aid of a gesture in parallel with another activity without this distracting the operator from his or her primary activity.

Preferably, at least one embodiment of the inventive command communication facility is configured to convey haptic feedback to the operator in response to a recognized command. Advantageously, the operator receives information confirming that his or her command has been recognized and forwarded.

To provide such haptic feedback, at least one embodiment of the inventive command communication facility preferably comprises an actuator that is able to execute a mechanical movement to signal to an operator that a command issued via a movement, preferably a gesture, has been recognized and forwarded by the command communication facility. Such a movement of the actuator may for example comprise a vibration which is transmitted to the body of an operator and haptically perceived by the latter. Advantageously, a remote control action via a movement or gesture which traditionally is designed as non-haptic because, of course, no operator control switch is touched via the movement or gesture and therefore no mechanical feedback caused by the switch mechanism occurs as a result of a pressure point or counterforce against an operator control action, is supplemented by haptic feedback so that a person carrying out a control movement, preferably a gesture, receives a similar haptic impression as in the case of a direct actuation of a switch or a button. As the command communication facility is obviously affixed directly to the part of the body performing the control movement, the feedback is given at the point on the body of an operator from which the control movement was executed, which corresponds to the experience of a conventional control action via a direct mechanical actuation by hand or via an actuation using another part of the body.

There is therefore no need for an operator to adapt his or her normal behavior in terms of the haptics of the operation during remote control of a medical facility. Furthermore, because of the preferably instant haptic feedback, the operator does not have to wait for his or her action to be executed in order to verify whether his or her control command has been recognized, and if necessary only then repeat a control movement. Thus, the operator saves time as a result of the direct feedback and, in the event that there is no instant feedback, can be sure that the control movement has not been recognized, and can immediately repeat the control movement, or otherwise, if the operator receives an immediate feedback, continue with another control movement without delay.

Preferably, the second command communication facility of at least one embodiment of the inventive command communication system is configured to detect and identify a voice command from the operator following activation of the voice recognition unit and to relay a control command to the medical facility based upon the identified voice command. The activation can preferably be effected by way of a command forwarded by the first command communication facility, for example based upon a gesture of the operator. A certain protective function is achieved as a result. In other words, it is ensured that a voice command is also issued in order to actuate the medical facility.

For example, the gesture recognition unit or the voice recognition unit may comprise a capability to recognize confirmation signals of the following functions:
a release of radiation,
a triggering of a magnetic field,
movements of the medical device.

From a formal legal perspective, exposure due to x-rays is considered physical injury and may therefore only be employed with the consent of the patient.

Triggering gradients for an MRT scan can lead to a physical impairment of an acoustic nature since performing a scan without hearing protection is perceived as extremely loud.

Damage caused by motorized medical devices, for example the patient table of a mobile C-arm device, should be precluded by safety engineering measures.

The patient is therefore advantageously protected via a two-stage actuation comprising an initialization or activation of a command communication against unintended damage due to an increased exposure to radiation, exposure to a magnetic field or to a mechanical impact due to a movement of a medical device.

Likewise preferably, the gesture recognition unit of the first command communication facility of the inventive command communication system is embodied to detect one of the following gestures:
gripping or releasing using hands or fingers, zooming, moving,
moving eyes left, right, up, down, blinking,
moving head left or right.

Advantageously, the command space and the input options can be expanded via the described gestures. Many gestures using other parts of the body are particularly well suited for particular workflows. It is to be regarded as a clear advantage of all the input options listed here that except for the wearing of special glasses, equipped with camera(s) and acceleration sensor, no special device needs to be worn or attached to the person, for example a sensor glove or the like. The user's freedom of movement and previous habits are therefore not restricted since the sensors for detecting actions are adapted to the user, and not the other way round.

Preferably, the first command communication facility of the inventive command communication system is configured to convey haptic feedback to the operator in response to a recognized command. Advantageously, the operator receives information confirming that his or her command has been recognized and passed on.

FIG. 1 shows a shoe 1 having two command communication facilities 2 according to an example embodiment of the invention. The command communication facilities 2 are embodied as wireless shoe sensors and are integrated in each case into a sole of a shoe via fixing units 2a, which enclose the command communication facilities 2 in each case. A movement of the shoe 1 is detected by a command communication facility 2 via sensors (see FIG. 2) and evaluated. A command is generated based upon the evaluation and forwarded to a medical facility in order to initiate a control action, in particular a switching on or switching off of a medical facility by remote control, without the operator having to approach the medical facility or use his or her hands for a switching operation.

FIG. 2 schematically illustrates a command communication facility 2 according to an example embodiment of the invention. The command communication facility 2 comprises a plurality of sensors 3a, 3b, 3c which detect a movement or other physical information. The sensors 3a, 3b, 3c may for example each comprise a pressure sensor which measures a change in electrical voltage in response to an external mechanical application of force. The generated sensor signals are transmitted with ultra-low energy consumption to an evaluation unit 4, for example a microcontroller 4, which is likewise part of the command communication facility 2. The microcontroller 4 generates a command signal based upon the sensor signals. The command communication facility 2 also comprises a transmit/receive unit, in the simplest case an RF transmitter 5, and an antenna 7 for transmitting a command signal generated based upon an operator's expression of will as determined by the evaluation unit 4.

The transmit/receive unit 5 may also be used as an interface for receiving additional external sensor signals transmitted by external units to the command communication facility 2. For example, an external acoustic sensor unit and an external image data acquisition unit can detect and acquire information via vocal utterances and movements or changes in posture of an operator and transmit this information to the command communication facility 2.

The acoustic data and image data can then be evaluated by the evaluation unit 4 in addition to the sensor data acquired by the internal sensors 3a, 3b, 3c in order to determine an operator's expression of will.

In addition, the command communication facility 2 comprises an internal electronic energy generation and energy storage unit 6. The energy generation and energy storage unit 6 comprises a piezoceramic element by which electrical energy is generated by an application of mechanical force to the cited element and can be stored. For example, a movement of a shoe, a leg or an arm can be used to generate electrical energy in the course of an energy harvesting process. This is then stored in an electrical energy store, for example a capacitor or an accumulator, and used to supply the microcontroller 4 or the evaluation unit 4, the transmitter 5 and the sensors 3a, 3b, 3c with electrical energy.

FIG. 3 illustrates a permanently installed receive facility 10 of a command communication system according to an example embodiment of the invention. Such a command communication system 50 (see FIG. 5) comprises the command communication facility 2 shown in FIG. 2 as well as the permanently installed receive facility 10 shown in FIG. 3. The permanently installed receive facility 10 is mounted for example on a medical facility, such as the CT system 50 shown in FIG. 5, for example. The permanently installed receive facility 10 comprises a wireless receive unit 11 and an actuator system 12. The wireless receive unit 11 comprises an antenna 13 and a receiver 14, for example an RF receiver, for receiving a command signal from a command communication facility 2 installed in or on a shoe 1. In addition, the wireless receive unit 11 also comprises a microcontroller 15 which is configured to evaluate a command signal received from the wireless receive unit 11. An initialization command IB is issued to the actuator system 12 based upon the command signal. The actuator system 12 comprises a system microcontroller 16 and an actuator 17. The system microcontroller 16 receives the initialization command IB and transmits a control command to an actuator or a switch which is actuated in order to initiate a startup of a medical imaging facility.

FIG. 4 schematically illustrates a shoe-mounted gesture sensor 20 according to an example embodiment of the invention. The shoe-mounted gesture sensor 20 comprises an inertial sensor system 21 by which an acceleration, a rotation or a magnetic field can be measured. Such a sensor system may for example comprise components in which devices known as MEMS are integrated in ICs and which provide a serial interface to a microcontroller. The detected sensor signals are transmitted by the inertial sensor system 21 to a microcontroller 22 which consumes an exceptionally small amount of energy. Based upon the sensor signals generated by the inertial sensor system 21, the microcontroller 22 generates a gesture command signal and transmits the gesture command signal to a transmit/receive unit 5 which is likewise part of the shoe-mounted gesture sensor 20.

The transmit/receive unit 5 generates an initialization command signal, which is transmitted with the aid of an antenna 7 to a permanently installed receive facility. Also part of the shoe-mounted gesture sensor 20 is an energy supply 6, which may be embodied for example in the manner depicted in FIG. 2. In addition, the shoe-mounted gesture sensor 20 also comprises a unit 25 for conveying haptic feedback to an operator. If the operator issues an initialization command with the aid of a gesture, the inertial sensor system 21 detects the movement and transmits the acquired sensor signal to the microcontroller 22. The microcontroller 22 evaluates the sensor signal and, if it recognizes a gesture signifying an initialization command, outputs a corresponding command signal to the transmit/receive unit 5 and additionally transmits a control signal to the unit 25 for conveying haptic feedback. The unit 25 for conveying haptic feedback thereupon generates a mechanical signal, for example a vibration movement, by which the operator or the wearer of the shoe-mounted gesture sensor 20 is informed that the command generated by him or her via a gesture has been recognized and forwarded. By way of the command, an input for a medical imaging facility is then enabled, for example. By way of a further gesture, for example via a hand movement or an eye or head movement, the operator can then initiate a switching on and setting of an x-ray tube. The cited gesture is captured for example by an image acquisition unit and received and evaluated by a permanently installed receive unit disposed on the medical imaging facility. Advantageously, control processes can be made more reliable via a control gesture with the aid of a shoe-mounted gesture sensor 20, thus preventing any control action that could cause damage to a patient from being triggered inadvertently.

FIG. 5 shows a computed tomography system 50 according to an example embodiment of the invention. The computed tomography system shown here features an acquisition unit 57, comprising a radiation source 58 in the form of an x-ray source as well as a radiation detector 59 in the form of an x-ray detector. During the acquisition of x-ray projections, the acquisition unit 57 rotates around a system axis 55, and during the acquisition the x-ray source 58 emits beams 52 in the form of x-rays. The x-ray source 58 is an x-ray tube. The x-ray detector 59 is a line detector having a plurality of lines.

During the acquisition of projections, a patient 53 lies on a patient couch 56. The patient couch 56 is connected to a couch base 54 such that it supports the patient couch 56 carrying the patient 53. The patient couch 56 is configured to move the patient 53 along a scanning direction through the bore 60 of the acquisition unit 57. The scanning direction is typically given by the system axis 55, which is aligned in the z-direction. The acquisition unit 57 rotates around the z-axis during the acquisition of x-ray projections. In this example, the body axis of the patient is identical to the system axis 55. Both axes lie on the z-axis of a three-dimensional Cartesian coordinate system. During a spiral scan, the patient couch 56 is moved continuously through the bore 60 while the acquisition unit 67 rotates around the patient 53 and records x-ray projections. The x-rays accordingly describe a spiral on the surface of the patient 53.

The x-ray image acquisition facility 51 features a computer 62 which is connected to a display unit 61, for example for the purpose of graphically displaying x-ray images, as well as to an input unit 67. The display unit 61 may be for example an LCD, plasma or OLED screen. It may also be a touch-sensitive screen which is also embodied as an input unit 67. Such a touch-sensitive screen may be integrated into the imaging device or be embodied as part of a mobile device. The input unit 67 may be for example a keyboard, a mouse, a touchscreen, or a microphone for voice input. The input unit 67 may also be configured to detect movements of a user and translate them into corresponding commands. Via input unit 67 it is possible for example for a selected reference dataset to be modified by a user.

The computer 62 is connected for data exchange purposes to the rotatable acquisition unit 57. Via the connection 64, control signals for the x-ray image acquisition are transmitted by the computer 62 to the acquisition unit 57 on the one hand, while on the other hand acquired projection data is transferred to the computer 62 for the purpose of an image reconstruction. The connection 64 is realized as wired or wireless in a known manner.

The computer 62 comprises a computing unit 66. The computing unit 66 is embodied as an image processing or image data processing unit. It is configured to perform data processing steps in relation to at least one embodiment of the inventive method. The computing unit 66 can interact with a computer-readable data medium 63, in particular in order to receive and process commands via a computer program having program code and to control an imaging procedure. Furthermore, the computer program may be retrievably stored on the machine-readable medium. In particular, the machine-readable medium may be a CD, DVD, Blu-Ray disk, a memory stick or a hard disk. The computing unit 66 may be embodied in the form of hardware or in the form of software. The computing unit 66 is embodied for example as an FPGA (acronym for Field Programmable Gate Array) or comprises an arithmetic logic unit.

Also shown in FIG. 5 is a command communication system (see in detail in FIG. 7) having a transmit unit 2M and a receive unit 2S. The receive unit 2S is embodied as a slave circuit in the form of a radio interface as part of the computer 62. The transmit unit 2M is integrated into a shoe 1 of an operator P and is implemented as a master circuit. The operator P can now enable a voice recognition function of the receive unit 2S embodied as a slave circuit via a movement sequence of the shoe 1. Next, the operator P issues a voice command, which is received and interpreted by the receive unit 2S. Based upon this interpretation, the receive unit 2S generates a command for executing a function, such as browsing through images or changing a contrast, for example. To implement the command, a switch 12 functioning as an actuator may also be actuated by the receive unit 2S. The switch 12 serves for example to release the radiation via the radiation source 58.

Figure 6:
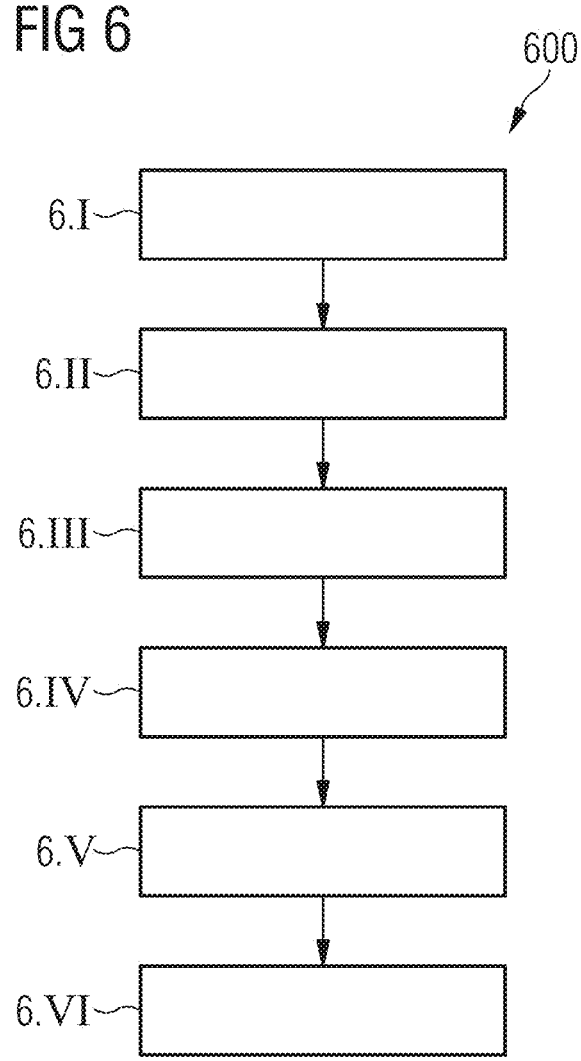
FIG. 6 is a flowchart which illustrates a command communication method according to an example embodiment of the invention, FIG. 7 schematically illustrates a command communication system according to an example embodiment of the invention, FIG. 8 schematically illustrates a command communication system according to an example embodiment.

FIG. 6 shows a flowchart 600 which illustrates a command communication method according to an example embodiment of the invention. At step 6.I, a movement of an operator P is detected by a first command communication facility 2M disposed on the operator P. For example, an experienced radiologist currently using his hands to examine a patient is standing next to a mobile C-arm device. Because the radiologist is carrying out the examination using his hands, he has no hands free at present for simultaneously actuating the C-arm device in order to image the patient P. The radiologist therefore wears a first command communication facility 2M already described in FIG. 1 and FIG. 2 in one of his shoes 1 or in both shoes 1. The first command communication facility 2M is initialized in a master mode, i.e. only the electronic sensor for detecting motion is activated in the master mode, yet the voice recognition is deactivated since the first command communication facility 2M in this example embodiment is used only to enable a voice recognition function of an identically constructed second command communication facility 2M, which is disposed on the C-arm device.

Furthermore, at step 6.II, the detected movement of the operator, i.e. the radiologist in this actual example embodiment, is evaluated and a command identified based upon the detected movement. The movement of the operator P may for example comprise a foot tapping sequence composed of three foot tapping movements. In this actual example embodiment, the command is an enable command by which the second command communication facility 2S is switched to ready-to-receive for a voice command of the radiologist. At step 6.III, the identified command is then transmitted wirelessly to the second command communication facility 2S, which is disposed on the medical facility that is to be operated, in this case a C-arm device. At step 6.IV, the voice recognition function of the second command communication facility 2S is then activated. At step 6.V, the second command communication facility 2S detects a voice command given by the radiologist and evaluates it via the internal voice recognition function. For example, the words "Browse" or "Previous image" or "Next image" are recognized. This command is interpreted by the second command communication facility 2S as a command for browsing between a plurality of image datasets, but only when the gesture command described at step 6.II has been issued and recognized, and at step 6.VI, a corresponding control command is transmitted wirelessly or by cable to an image presentation unit of a C-arm device by which switching back and forth between different image datasets is effected. An unintentional triggering of an action can be avoided as a result of this two-stage procedure.

Figure 7:
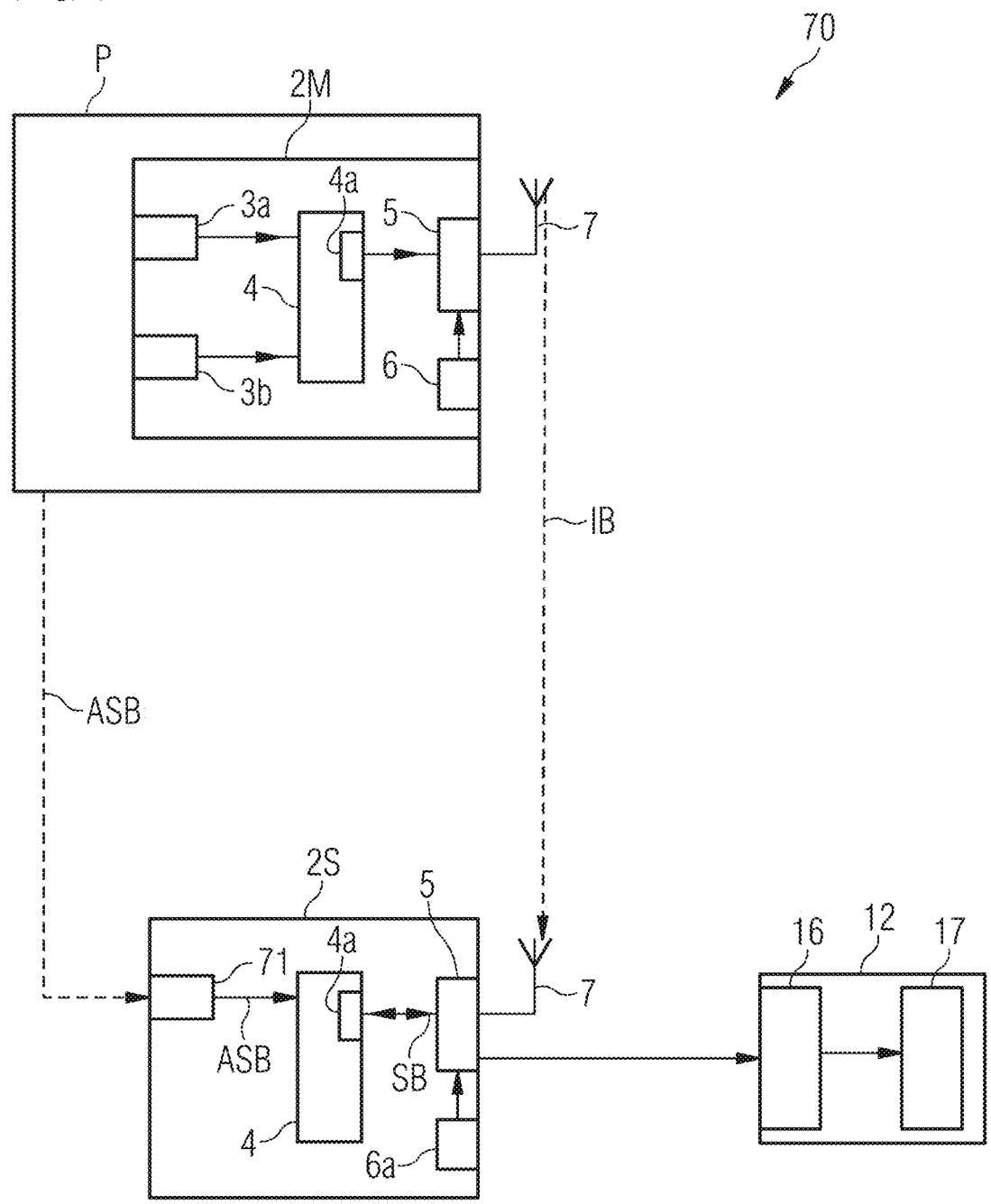

FIG. 7 schematically illustrates a command communication system 70 according to an example embodiment of the invention. Such a command communication system 70 finds application in the system 50 shown in FIG. 5, for example. The command communication system 70 shown in FIG. 7 comprises a transmit unit 2M attached to an article of clothing of an operator P, for example fitted in a shoe, and a receive unit 2S mounted on an imaging medical system (not shown). The layout of the transmit unit 2M corresponds to a large extent to the layout shown in FIG. 2 of the command communication facility 2 illustrated there. Like the command communication facility 2 shown in FIG. 2, the transmit unit 2M also has an energy generation and storage unit 6 in the form of an energy harvesting unit, by which the movement of the operator P is converted into electrical energy and the energy can also be stored.

The transmit unit 2M shown in FIG. 7 additionally comprises a voice recognition unit 4a by which acoustic sensor signals that were captured for example by an external acoustic sensor unit and that are forwarded via the transmit/receive unit 5 to the voice recognition unit 4a can be investigated in terms of information content, i.e. for words and phrases. However, the transmit unit 2M is in this case embodied as a master unit and serves for initializing a two-stage command sequence by which a safety-critical actuation of a medical device can be performed in a failsafe manner. The voice recognition unit 4a is therefore not required in the transmit unit 2M installed as the master unit and consequently is also not enabled. However, a component 2S of largely similar construction to the transmit unit 2S can advantageously be used as the receive unit 2S, in which component the described function for evaluating acoustic information and for voice recognition finds application. The receive unit 2S differs from the transmit unit 2M to the extent that its energy supply 6a is not based on kinetic energy recovery from motion because the receive unit 2S is fixedly disposed on a medical facility and therefore cannot use kinetic energy for generating electrical energy. The energy supply 6a mounted on the receive unit 2S may for example comprise a battery unit or a power grid connection. The receive unit 2S is furthermore connected to an actuator unit 12 via a data transmission line. The actuator unit 12 comprises a system microcontroller 16 and for example a switch arrangement 17 by which a function of the medical facility can be triggered.

The mode of operation of the command communication system 70 shown in FIG. 7 is as follows: If the operator P wants to trigger a function of the medical facility, he first of all moves his foot in a predetermined manner. For example, he taps once with his heel, once with his toes, and once again with his heel. The sensor signals of the pressure sensors 3a, 3b, 3c of the transmit unit 2M triggered by these movements are forwarded to the evaluation unit 4 of the transmit unit 2M. The evaluation unit 4 of the transmit unit 2M now recognizes based upon the detected sensor signals that the voice recognition 4a of the receive unit 2S is to be enabled. An initialization command IB is therefore transmitted via the radio unit 5 or its antenna 7 to the radio unit 5 of the receive unit 2S. The receive unit 2S evaluates the received initialization command IB via its evaluation unit 4 and enables its voice recognition unit 4a because it now expects to receive a voice command ASB next. The operator P thereupon issues a voice command ASB, for example by saying the words "Energy on", he wishes to effect an emission of radiation from the medical facility. The voice command ASB is now detected by an acoustic sensor unit 71 which is part of the receive unit 2M, for example a microphone, and forwarded to the voice recognition unit 4a of the evaluation unit 4 of the receive unit 2S. The voice recognition unit 4a of the receive unit 2S now determines the content of the voice command ASB given by the operator P. In this case it is established that a dose of radiation is to be triggered. A control command SB is therefore forwarded to the actuator unit 12 via the data transmission unit 5 in order to initiate a release of radiation. The safety-critical triggering of the radiation dose is therefore only carried out when two independent commands, each generated in a different way, are issued in quick succession so that an accidental activation of a release of radiation can be avoided.

Figure 8:
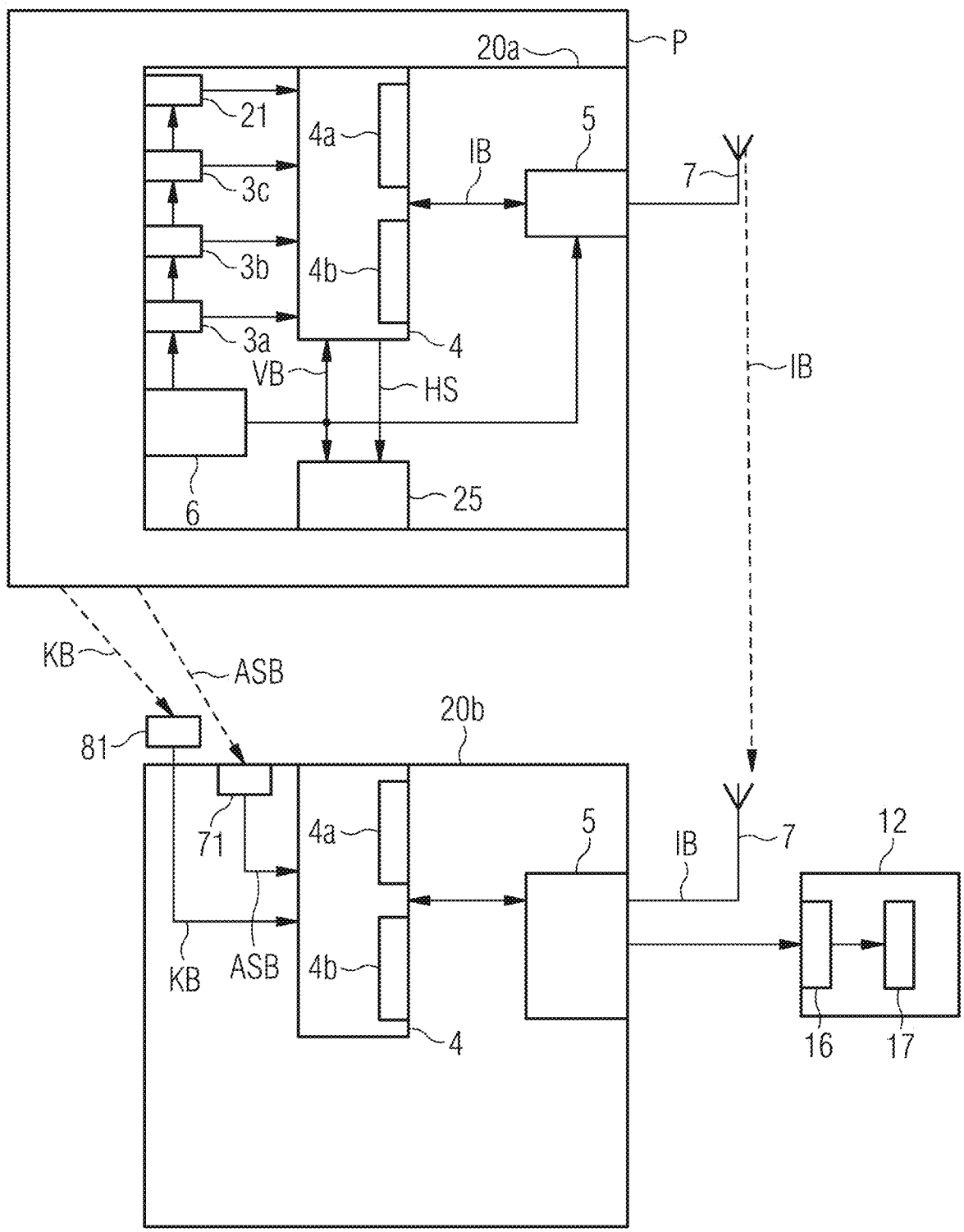

FIG. 8 shows a command communication system 80 according to an alternative example embodiment of the invention. The command communication system 80 shown in FIG. 8, like the command communication system 70 shown in FIG. 7, comprises a transmit unit 20a and a receive unit 20b. The transmit unit 20a is embodied as the master unit, i.e. the transmit unit 20a serves to monitor and control a command detection by the receive unit 20b embodied as a slave unit.

Structurally, the transmit unit 20a used by the command communication system 80 shown in FIG. 8 is modeled on the shoe-mounted gesture sensor 20 shown in FIG. 4. In particular, the transmit unit 20a shown in FIG. 8 comprises an inertial sensor 21 by which a gesture, i.e. a movement of a shoe, can be detected via acceleration measurement and measurement of a rotational movement. The transmit unit 20a comprises a plurality of different sensors 3a, 3b, 3c, 21 so as to be able to respond in a flexible manner to different types of input, plus an evaluation unit 4 for evaluating sensor signals and for assigning command contents to detected movements, voice commands or postures or gestures of an operator that are to be detected by optical device(s). The transmit unit 20a includes pressure sensor units 3a, 3b, 3c by which a weight shift of the foot, for example onto the toes or the heel, can be detected. The transmit unit 20a further comprises, as already mentioned, an inertial sensor unit 21 by which accelerated movements of a shoe can be detected. In addition, the transmit unit 20a comprises a voice recognition unit 4a which is part of the evaluation unit 4 and by which voice commands can be recognized based upon acoustic measurement data. Acoustic measurement data can be received for example via the transmit/receive unit 5 by an acoustic sensor 71, for example a microphone, and evaluated by the voice recognition unit 4a. Contrary to the variants shown thus far in FIG. 1 to FIG. 7, the transmit unit 20a shown in FIG. 8 comprises an image analysis unit 4b, which is part of the evaluation unit 4, for recognizing gestures of the operator in image data recorded by an external video camera 81 for example and subsequently evaluated by the image analysis unit 4b of the transmit unit 20a.

Furthermore, the transmit unit 20a shown in FIG. 8, like the shoe sensor 20 shown in FIG. 4, comprises a unit 25 for communicating haptic feedback. If an operator P moves his shoe or performs some other movement that is detectable by one of the described sensors in order to enable a gesture or voice recognition function of the receive unit 20b, the sensor signals are evaluated by the evaluation unit 4 of the transmit unit 20a and information associated with the signals is ascertained.

If the evaluation unit 4 of the transmit unit 20a recognizes a gesture or a voice command signifying an initialization command IB, it outputs a corresponding command signal to the transmit/receive unit 5 and in addition relays a control signal HS to the unit 25 for conveying haptic feedback. The unit 25 for conveying haptic feedback thereupon generates a mechanical signal, for example a vibration movement VB, by which the operator P or the wearer of the shoe-mounted gesture sensor is informed that the command IB generated by him or her via a gesture and/or a voice command has been recognized and passed on. Via the command IB, an input for a medical imaging facility is then enabled, for example. Next, the operator P can trigger a function of a medical imaging facility via a further gesture, for example via a hand movement or an eye or head movement, or via a voice command or by a combination thereof.

For example, an initialization command IB is determined by which a visual gesture recognition 4b and also a voice recognition 4a of the evaluation unit 4 of the receive unit 20b are to be enabled. After the receive unit 20b, which is substantially similar in construction to the transmit unit 20a, has received the initialization command IB via its transmit/receive unit 5 and has enabled its voice recognition unit 4a and its image analysis unit 4b, the operator P can make a gesture, for example a head movement KB, and at the same time issue a voice command ASB. The head movement KB is detected by an external camera 81 and forwarded to the transmit/receive unit 5 of the receive unit 20b. The voice command is picked up by a microphone integrated in the receive unit 20b and forwarded to the voice recognition unit 4a of the receive unit 20b.

The microcontroller 4 of the transmit unit 20a also evaluates sensor signals of the sensors 3a, 3b, 3c, and in the event that it recognizes a gesture signifying an initialization command IB, it outputs a corresponding command signal to the transmit/receive unit 5 and in addition forwards a control signal HS to the unit 25 for conveying haptic feedback. The unit 25 for conveying haptic feedback thereupon generates a mechanical signal, for example a vibration movement VB, by which the operator or the wearer of the shoe-mounted gesture sensor 20a is informed that the command generated by him or her via a gesture has been recognized and passed on. Via the command, an input for a medical imaging facility is then enabled, for example. Next, the operator can initiate a switching on and setting of an x-ray tube via a further gesture, for example via a hand movement or an eye or head movement and possibly a simultaneous voice command.

The receive unit 20b is of similar construction to the transmit unit 20a, though dispenses with a plurality of different sensors 3a, 3b, 3c, 21 since these are not required for the receiving function. The receive unit 20a additionally comprises a voice recognition unit 4a by which voice commands can be received or recorded by a microphone 71 and evaluated, for example. Analogously to the transmit unit 20a, the receive unit 20b shown in FIG. 8 also comprises an image analysis unit 4b for evaluating image data from an external optical sensor unit, for example a video camera 81. Gestures of the operator P, for example, can be captured via the video camera 81 and subsequently evaluated by the evaluation unit 4 or the image analysis unit 4b of the receive unit 20b. If gestures and voice commands are now recognized by the image analysis unit 4b or the voice recognition unit 4a of the receive unit 20b, an action command is forwarded to an actuator unit 12, which triggers a function of the medical imaging facility. For this purpose, the actuator unit comprises a system microcontroller 16 and, for example, a switch arrangement 17 by which a function of the medical facility can be initiated.

In conclusion, it is pointed out once again that the above-described methods and apparatuses are simply preferred example embodiments of the invention and that the invention may be varied by the person skilled in the art without leaving the scope of the invention insofar as this is specified by way of the claims. Thus, the method and the command communication facility have been explained primarily with reference to a system for the acquisition of medical image data. However, the invention is not limited to an application in the field of medicine but may also be applied generally to the acquisition of images for other purposes. For the sake of completeness, it is also pointed out that the use of the indefinite articles "a" or "an" does not exclude the possibility that the features in question may also be present more than once. Similarly, the term "unit" does not rule out the possibility that this may consist of a plurality of components, which if necessary may also be distributed in space.

Of course, the embodiments of the method according to the invention and the embodiments of the imaging apparatus according to the invention described here should be understood as being example. Therefore, individual embodiments may be expanded by features of other embodiments. In particular, the sequence of the method steps of the method according to the embodiments of the invention should be understood as being example. The individual steps can also be performed in a different order or overlap partially or completely in terms of time.

The patent claims of the application are formulation proposals without prejudice for obtaining more extensive patent protection. The applicant reserves the right to claim even further combinations of features previously disclosed only in the description and/or drawings.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A command communication system, comprising:
   a command communication facility including
      a sensor configured to detect a movement or gesture of an operator,
      a fixing device configured to secure at least one of the sensor or the command communication facility to the operator, and
      first circuitry configured cause the command communication facility to
         evaluate the detected movement or gesture, identify a command based upon the movement or gesture, transmit, to a receiver located a distance from the operator, an initialization signal in response to determining the command is an initialization command, and transmit a control command to operate a medical facility to the receiver in response to determining the command is a control command; and the receiver including second circuitry configured to cause the receiver to receive image data from an optical sensor, detect the movement or gesture of the operator based on the image data, determine the control command based on the movement or gesture, and transmit the control command to the medical facility in response to determining the control command based on the data and receiving the control command from the command communication facility after receiving the initialization signal from the communication facility.

2. The command communication system of claim 1, wherein the first circuitry is configured to cause the command communication facility to recognize a gesture.

3. The command communication system of claim 2, wherein the first circuitry is configured to cause the command communication facility to recognize the gesture by detecting a movement of the sensor or detecting a mechanical force acting on the sensor.

4. The command communication system of claim 3, wherein the fixing device is configured to secure the sensor to or in an article of clothing.

5. The command communication system of claim 4, wherein the fixing device is a recess in a sole of a shoe.

6. The command communication system of claim 2, wherein the fixing device is configured to secure the sensor to or in an article of clothing.

7. The command communication system of claim 6, wherein the fixing device is a recess in a sole of a shoe.

8. The command communication system of claim 6, wherein the fixing device is configured to secure the sensor to a shoe.

9. The command communication system of claim 8, wherein the fixing device is a recess in a sole of the shoe.

10. The command communication system of claim 2, wherein the first circuitry is further configured to cause the command communication facility to recognize a gesture indicating at least one of scrolling images on an image display of a medical device, or changing parameters of the medical device.

11. The command communication system of claim 2, further comprising a radio transmitter configured to transmit the command to the receiver.

12. The command communication system of claim 2, wherein the command communication facility includes an energy generation and storage unit, configured to generate electrical energy from kinetic energy of the operator.

13. The command communication system of claim 2, wherein the sensor includes an acoustic sensor, and the first circuitry is further configured to cause the command communication facility to recognize and interpret voice commands of the operator.

14. The command communication system of claim 1, wherein the command communication facility includes a radio transmitter configured to transmit the command to the receiver.

15. The command communication system of claim 1, wherein the command communication facility includes an energy generation and storage unit, configured to generate electrical energy from kinetic energy of the operator.

16. The command communication system of claim 1, wherein the sensor includes an acoustic sensor, and the first circuitry is further configured to cause the command communication facility to recognize and interpret voice commands of the operator.

17. The command communication system of claim 16 wherein the second circuitry is further configured to cause the receiver to recognize and interpret voice commands of the operator.

18. The command communication system of claim 1, wherein the second circuitry is further configured to cause the receiver to detect and identify a voice command from the operator in response to receiving the initialization signal, and relay a control command to the medical facility based upon the identified voice command.

19. The command communication system of claim 1, wherein the first circuitry is configured to cause the command communication facility to recognize at least one of a release of radiation, or movements of the medical facility.

20. The command communication system of claim 1, wherein the first circuitry is configured to cause the command communication facility to detect at least one of gripping or releasing using hands or fingers, zooming, moving, moving eyes left, right, up, down, blinking, or moving head left or right.

21. The command communication system of claim 1, wherein the command communication facility is configured to convey haptic feedback to the operator in response to a command being recognized.

22. An operating system, comprising:

an imaging medical facility, an operating facility, the command communication system of claim 1, configured to transmit a control command to the imaging medical facility.

23. An operating system, comprising:

an imaging medical facility, an operating facility, the command communication system of claim 1, configured to transmit a control command to the imaging medical facility.

24. The command communication system of claim 1, wherein the first circuitry is further configured to cause the command communication facility to:

classify the movement as either an intended or an unintended movement; and identify the command in response to classifying the movement as an intended movement.

25. The command communication system of claim 1, wherein the fixing device is configured to attach the sensor to one or more individual toes of the operator.

26. The command communication system of claim 1, wherein the command communication facility is a master facility configured to communicate with the receiver via a bidirectional data exchange, the receiver is a slave facility configured to communicate with the command communication facility via the bidirectional data exchange, the receiver is on the medical facility, and the second circuitry is further configured to cause the receiver to perform voice recognition, receive the command from the command communication facility, and transmit the control command to the medical facility in response to determining that the command is the control command.

27. The command communication system of claim 1, wherein the first circuitry is further configured to cause the command communication facility to convey haptic feedback to the operator in response to determining the command is an initialization command.

28. A command communication method, comprising:

detecting a movement or gesture of an operator via a sensor disposed on the operator;

automatically evaluating the detected movement or gesture;

identifying a command based upon the movement or gesture detected;

transmitting, to a receiver located a distance from the operator, an initialization signal in response to determining the command is an initialization command;

conveying haptic feedback to the operator in response to determining the command is an initialization command;

transmitting a control command to operate a medical facility to the receiver in response to determining the command is a control command;

receiving, by the receiver, image data from an optical sensor;

detecting, by the receiver, the movement or gesture of the operator based on the image data;

determining the control command based on the movement or gesture detected based on the image data; and transmitting, by the receiver, the control command to the medical facility in response to determining the control command based on the image data and receiving the control command after the initialization signal.

29. A non-transitory computer program product storing a computer program, directly storable in a memory facility of a command communication system, including program sections for performing the method of claim 28 when the computer program is executed in the command communication system.

30. A non-transitory computer-readable medium storing program sections, readable in and executable by a computer unit, to perform the method of claim 28 when the program sections are executed by the computer unit.

31. A receiver comprising:

circuitry configured cause the receiver to receive, from a command communication facility secured to an operator, an initialization signal, the receiver being located a distance from the operator, receive, from the command communication facility, a control command to operate a medical facility, the control command based on a movement or gesture of the operator, receive, from an optical sensor, image data, detect the movement or gesture of the operator based on the image data, determine the control command based on the movement or gesture detected based on the image data, and transmit the control command to the medical facility in response to determining the control command based on the image data and receiving the control command from the command communication facility after receiving the initialization signal from the command communication facility.

\* \* \* \* \*